United States Patent [19]

Gugumus

[11] Patent Number: 4,734,449
[45] Date of Patent: Mar. 29, 1988

[54] SYNERGISTIC MIXTURES OF NICKEL-CONTAINING 2,2'-THIOBIS(ALKYLPHENOLS) AND 2-HYDROXY-4-ALKOXYBENZOPHENONES

[75] Inventor: François Gugumus, Allschwil, Switzerland

[73] Assignee: Ciba-Geigy Corporation, Ardsley, N.Y.

[21] Appl. No.: 895,602

[22] Filed: Aug. 7, 1986

Related U.S. Application Data

[62] Division of Ser. No. 688,090, Dec. 31, 1984, Pat. No. 4,623,480.

[30] Foreign Application Priority Data

Jan. 5, 1984 [CH] Switzerland .............................. 32/84

[51] Int. Cl.$^4$ ..................... C08K 5/13; C09K 15/22; C09K 15/26
[52] U.S. Cl. ................ 524/328; 252/400 R; 252/402; 252/403
[58] Field of Search .................... 524/328; 252/400 R, 252/402, 403

[56] References Cited

U.S. PATENT DOCUMENTS

| | | | |
|---|---|---|---|
| 3,218,294 | 11/1965 | Rodgers et al. | 524/328 |
| 3,655,708 | 4/1972 | Gobstein | 556/139 |
| 3,692,738 | 9/1972 | Mathis et al. | 524/204 |
| 4,077,902 | 3/1978 | Moser et al. | 252/400 A |
| 4,097,454 | 6/1978 | Tozzi et al. | 524/328 |
| 4,255,304 | 3/1981 | Tucker | 524/570 |

Primary Examiner—John Kight
Assistant Examiner—Kriellion Morgan
Attorney, Agent, or Firm—Luther A. R. Hall

[57] ABSTRACT

Stabilizer systems containing at least two Ni-containing light-stabilizers in which nickel (which, in class 2, optionally contains an additional ligand) forms a complex compound with a compound selected from the group consisting of the classes:
1. 2-hydroxy-4-alkoxybenzophenones
2. 2,2'-thiobis[4-alkylphenols]
3. 3,5-dialkyl-4-hydroxybenzoic acid monoalkyl esters
4. 3,5-dialkyl-4-hydroxybenzylphosphonic acid monoalkyl esters
5. 1-phenyl-3-methyl-4-acyl-5-hydroxypyrazole, in which the radicals generally contained are appropriately substituted. After being incorporated into the corresponding polyolefins, these stabilizer systems have a synergistic effect which prevents or at least greatly retards decomposition initiated by light and/or oxygen.

2 Claims, No Drawings

SYNERGISTIC MIXTURES OF NICKEL-CONTAINING 2,2'-THIOBIS(ALKYLPHENOLS) AND 2-HYDROXY-4-ALKOXYBENZOPHENONES

This is a divisional of application Ser. No. 688,090, filed on Dec. 31, 1984, now U.S. Pat. No. 4,623,480, issued on Nov. 18, 1986.

The present invention relates to mixtures of nickel stabilisers and their use for the improved stabilisation of polyolefins against the action of light.

Like other substances, organic plastics materials undergo certain changes in their properties in the course of time, these changes occurring more or less rapidly depending on the influences by which they are caused. The changes can generally be more or less prevented by the addition of so-called stabilisers to the polymer. It is known that additives can be added to organic polymers in order to protect these substrates from decomposition initiated by light or atmospheric oxygen. Great demands are made on additives; they should therefore be able to prevent or at least greatly retard the ageing phenomena of an organic polymer. For example, yellowing phenomena, loss of surface lustre or transparency, and also loss of impact strength, flexural strength and stretching ability should be largely suppressed. It is known, for example, from DE-AS No. 1 144 004 that polyolefins can be protected against decomposition caused by light and heat using Ni-phenolates of bi-(alkylphenol)-monosulphides. In addition, it is known from Swiss Patent Specification No. 457 837 that nickel salts of certain phosphonic acids or phosphonic acid semi-esters prevent the discoloration of polymeric organic substances under the influence of light. Those stabilisers are not, however, equal to the increased demands in every respect.

It has now been found that compositions based on polyolefins and containing at least two nickel stabilisers known per se as agents for stabilising plastics against the action of light (referred to herein as "light-stabilisers") have a surprising synergistic effect as regards the protection of the polyolefin against decomposition caused by light since, although the Ni-containing stabilisers used in these compositions are themselves light-stabilisers, they do not have the degree of activity now obtained.

The present invention relates to compositions containing at least two Ni-containing light-stabilisers selected from the group that consists of the classes:

1. compounds having the formula I

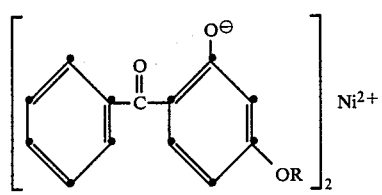

(I)

in which R represents $C_1$–$C_{12}$ alkyl, 2. compounds having the formula II or II'

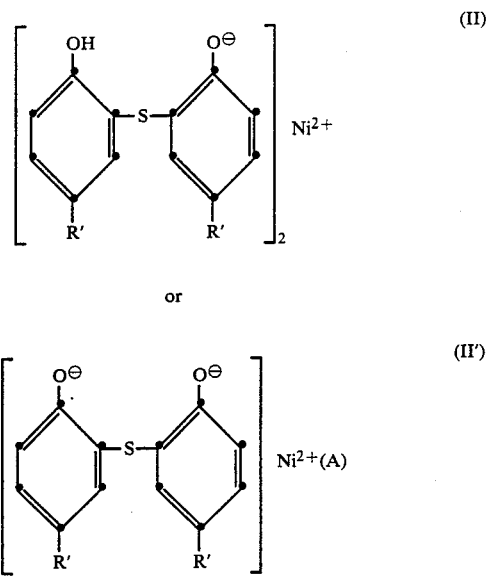

in which R' represents $C_1$–$C_8$ alkyl and in which nickel in the formula II' may optionally contain an additional ligand A, such as primary or secondary $C_1$–$C_{18}$ alkylamine, triethanolamine, cyclohexyldiethanolamine or aniline, anisidine, toluidine, 1-naphthylamine, 2-naphthylamine, p-butylaniline, xylidine, p-octyloxyaniline or morpholine, hexamethyleneimine, piperazine or piperidine, 3. compounds having the formula III

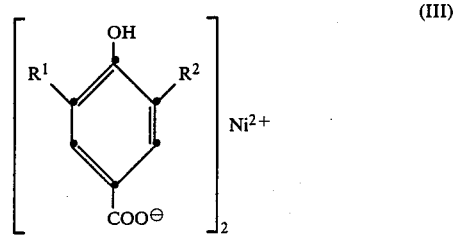

in which $R^1$ and $R^2$ are the same or different and represent $C_1$–$C_4$ alkyl, 4. compounds having the formula IV

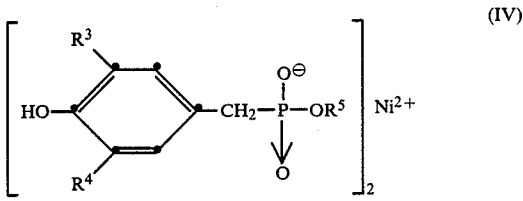

in which $R^3$ and $R^4$ are the same or different and represent $C_1$–$C_4$ alkyl and $R^5$ represents $C_1$–$C_{18}$ alkyl, and 5. compounds having the formula V

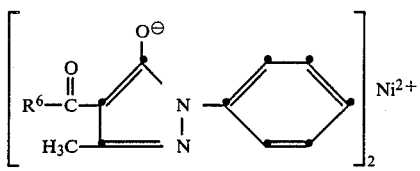

(V)

in which $R^6$ represents $C_4$–$C_{12}$ alkyl.

In formula I, R may be straight-chained or branched; preferably, R is straight-chained and represents $C_4$–$C_{12}$ alkyl, $C_4$–$C_{12}$ alkyl being n-butyl, n-hexyl, n-octyl, n-nonyl, n-decyl or n-dodecyl, preferably n-octyl, n-decyl or n-dodecyl.

In formulae II and II', R' may be straight-chained or branched; preferably, R' is branched and represents $C_4$–$C_8$ alkyl, $C_4$–$C_8$ alkyl being sec.-butyl, tert.-butyl, neopentyl, 2-diethylbutyl or tert.-octyl, preferably tert.-octyl. Tert.-octyl should be taken as meaning 1,1,3,3-tetramethylbutyl.

If nickel contains primary or secondary $C_1$–$C_{18}$ alkylamine as additional ligand A (in formula II'), the amine-substituents are straight-chain or branched alkyl radicals, preferably straight-chain $C_1$–$C_{12}$ alkyl radicals, especially n-propyl, n-butyl or n-dodecyl.

In formula III, $R^1$ and $R^2$ may be straight-chained or branched; they are preferably identical and branched and represent, especially, tert.-butyl.

In formula IV, $R^3$ and $R^4$ may be straight-chained or branched; they are preferably identical and branched and in that case represent, especially, tert.-butyl. The substituent $R^5$ may also be straight-chained or branched and represents, for example, methyl, ethyl, n-propyl, isopropyl, n-butyl, sec.-butyl, tert.-butyl, n-pentyl or n-hexyl, but preferably methyl, ethyl, n-propyl or n-butyl.

In formula V, $R^6$ may be straight-chained or branched and preferably represents $C_8$–$C_{12}$ alkyl, it being possible for the following radicals to be present: n-octyl, n-nonyl, n-decyl, n-undecyl or n-dodecyl, especially n-nonyl.

There may optionally be a further ligand, such as the ligand A given in class 2, in the nickel compounds of classes 1, 3, 4 and 5.

Preferred are those compositions containing two Ni-containing light-stabilisers in which one Ni-containing compound is based on class 2 and the other may originate from any one of classes 1, 3, 4 and 5.

Also preferred are compositions containing two Ni-containing light-stabilisers in which one Ni-containing compound is based on class 3 and the other may originate from either of classes 1 and 5.

Finally, there are preferred compositions containing two Ni-containing light-stabilisers in which one Ni-containing compound originates from class 1 and the other originates from class 5.

Especially preferred are compositions containing two Ni-containing light-stabilisers that are selected from the group consisting of (a) 2,2'-thiobis(4-tert.-octylphenolato)-butylaminonickel(II)/nickel(II) chelate of 2-hydroxy-4-octyloxybenzophenone (b) 2,2'-thiobis(4-tert.-octylphenolato)-butylaminonickel (II)/nickel-bis(1-phenyl-3-methyl-4-decanoyl-5-pyrazolate)

(c) 2,2'-thiobis[4-tert.-octylphenolato]-butylaminonickel(II)/nickel-bis[(ethyl-(3,5-di-tert.-butyl-4-hydroxybenzyl)-phosphonate)]

(d) 2,2'-thiobis[4-tert.-octylphenolato]-butylaminonickel(II)/bis[2,2'-thiobis(4-tert.-octylphenolato)]-nickel-(II)

(e) nickel(II) chelate of 2-hydroxy-4-octyloxybenzophenone/bis[2,2'-thiobis(4-tert.-octylphenolato)]-nickel(II)

(f) nickel(II) chelate of 2-hydroxy-4-octyloxybenzophenone/nickel-bis(1-phenyl-3-methyl-4-decanoyl-5-pyrazolate)

(g) nickel-bis[(ethyl-(3,5-di-tert.-butyl-4-hydroxybenzyl)-phosphonate]/bis[2,2'-thiobis(4-tert.-octylphenolato)]-nickel(II) and (h) bis[2,2'-thiobis(4-tert.-octylphenolato)]-nickel(II)/nickel-bis(1-phenyl-3-methyl-4-decanoyl-5-pyrazolate).

Especially preferred are compositions containing two Ni-containing light-stabilisers that are selected from the group consisting of (A) 2,2'-thiobis(4-tert.-octylphenolato)-butylaminonickel(II)/nickel-bis[(ethyl-(3,5-di-tert.-butyl-4-hydroxybenzyl)-phosphonate)]

(B) 2,2'-thiobis(4-tert.-octylphenolato)-butylaminonickel(II)/nickel-bis(1-phenyl-3-methyl-4-decanoyl-5-pyrazolate)

(C) 2,2'-thiobis(4-tert.-octylphenolato)-butylaminonickel(II)/nickel(II) chelate of 2-hydroxy-4-octyloxybenzophenone (D) bis[2,2'-thiobis(4-tert.-octylphenolato)]-nickel(II)/nickel-bis(1-phenyl-3-methyl-4-decanoyl-5-pyrazolate) and (E) bis[2,2'-thiobis(4-tert.-octylphenolato)]-nickel(II)/nickel(II) chelate of 2-hydroxy-4-octyloxybenzophenone.

The Ni-compounds occurring in the stabiliser systems according to the invention are manufactured according to known methods, such as described, for example, in Patent Specifications GB Nos. 943,081, 991,591, U.S. Pat. Nos. 3,029,276, 3,189,630, 3,310,575, CH No. 457,837 and U.S. Pat. No. 4,008,200. A number of the compounds are also commercially available.

Examples of plastics materials that can be provided with the stabiliser mixture according to the invention are:

1. Polymers of mono- and di-olefins, for example polyethylene (which may optionally be cross-linked), polypropylene, polyisobutylene, polybut-1-ene, polymethylpent-1-ene, polyisoprene or polybutadiene and also polymers of cyclo-olefins, such as, for example, cyclopentene or norbornene.

2. Mixtures of the polymers mentioned under 1., for example mixtures of polypropylene with polyisobutylene.

3. Copolymers of mono- and di-olefins with one another or with other vinyl monomers, such as, for example, ethylene/propylene copolymers, propylene/but-1-ene copolymers, propylene/isobutylene copolymers, ethylene/but-1-ene copolymers, ethylene/pent-1-ene copolymers, ethylene/4-methyl-1-pentene copolymers, ethylene/hex-1-ene copolymers, ethylene/oct-1-ene copolymers, propylene/butadiene copolymers, isobutylene/isoprene copolymers, ethylene/alkyl acrylate copolymers, ethylene/alkyl methacrylate copolymers, ethylene/vinyl acetate copolymers or ethylene/acrylic acid copolymers and salts thereof (ionomers), and also terpolymers of ethylene with propylene and a diene, such as hexadiene, dicyclopentadiene or ethylidenenorbornene.

4. Mixtures (polyblends) of the above-mentioned polymers, such as, for example, PP/EPDM.

Of great importance are, especially, polyolefins, and, very especially, polypropylene and polyethylene.

The compositions according to the invention are added to the polyolefins in a concentration of from 0.005 to 5% by weight, based on the weight of the polyolefin to be stabilised. Preferably, from 0.05 to 2% by weight and especially from 0.1 to 2% by weight of the compositions, based on the material to be stabilised, are incorporated into that material.

If the compositions according to the invention constitute a stabiliser system consisting of two stabilisers, then these are added to the polyolefin in a ratio of from 1:20 to 20:1.

The incorporation can be carried out, for example, by mixing in the Ni-containing light-stabilisers according to the invention, and optionally other additives, according to methods customary in the art, before or during shaping, or alternatively by applying the dissolved or dispersed compounds to the polymer, optionally with subsequent evaporation of the solvent. The additives can be incorporated separately or in the form of a mixture.

The compositions according to the invention can also be added to the plastics materials to be stabilised in the form of a master batch that contains these compounds, for example, in a concentration of from 2.5 to 25% by weight.

In the case of cross-linked polyethylene, the compositions according to the invention are added before cross-linking takes place.

The materials stabilised in this manner can be used in a wide variety of forms, for example in the form of films, especially agrofilms, fibres, tapes, moulding compositions, profiles, foamed articles or in the form of binders for lacquers, adhesives or cements.

In practice, the compositions according to the invention can be used together with other stabilisers. Examples of other additives together with which the stabilisers employed according to the invention can be used, are:

1. Antioxidants 1.1. Alkylated monophenols 2,6-di-tert.-butyl-4-methylphenol
2-tert.-butyl-4,6-dimethylphenol
2,6-di-tert.-butyl-4-ethylphenol
2,6-di-tert.-butyl-4-n-butylphenol
2,6-di-tert.-butyl-4-isobutylphenol
2,6-di-cyclopentyl-4-methylphenol
2-($\alpha$-methylcyclohexyl)-4,6-dimethylphenol
2,6-di-octadecyl-4-methylphenol
2,4,6-tri-cyclohexylphenol
2,6-di-tert.-butyl-4-methoxymethylphenol 1.2. Alkylated hydroquinones 2,6-di-tert.-butyl-4-methoxyphenol
2,5-di-tert.-butylhydroquinone
2,5-di-tert.-amylhydroquinone
2,6-diphenyl-4-octadecyloxyphenol 1.3. Hydroxylated thiodiphenyl ethers 2,2'-thiobis(6-tert.-butyl-4-methylphenol)
2,2'-thiobis(4-octylphenol)
4,4'-thiobis(6-tert.-butyl-3-methylphenol)
4,4'-thiobis(6-tert.-butyl-2-methylphenol)

1.4. Alkylidene bisphenols 2,2'-methylene-bis(6-tert.-butyl-4-methylphenol)
2,2'-methylene-bis(6-tert.-butyl-4-ethylphenol)
2,2'-methylene-bis[4-methyl-6-($\alpha$-methylcyclohexyl)-phenol]
2,2'-methylene-bis(4-methyl-6-cyclohexylphenol)
2,2'-methylene-bis(6-nonyl-4-methylphenol)
2,2'-methylene-bis(4,6-di-tert.-butylphenol)
2,2'-ethylidene-bis(4,6-di-tert.-butylphenol)
2,2'-ethylidene-bis(6-tert.-butyl-4-isobutylphenol)
2,2'-methylene-bis[6-($\alpha$-methylbenzyl)-4-nonylphenol]
2,2'-methylene-bis[6-($\alpha,\alpha$-dimethylbenzyl)-4-nonylphenol]
4,4'-methylene-bis(2,6-di-tert.-butylphenol)
4,4'-methylene-bis(6-tert.-butyl-2-methylphenol)
1,1-bis(5-tert.-butyl-4-hydroxy-2-methylphenyl)-butane
2,6-di-(3-tert.-butyl-5-methyl-2-hydroxybenzyl)-4-methylphenol
1,1,3-tris(5-tert.-butyl-4-hydroxy-2-methylphenyl)butane
1,1-bis(5-tert.-butyl-4-hydroxy-2-methylphenyl)-3-n-dodecylmercaptobutane
ethylene glycol-bis[3,3-bis-(3'-tert.-butyl-4'-hydroxyphenyl)-butyrate]
di-(3-tert.-butyl-4-hydroxy-5-methylphenyl)-dicyclopentadiene
di-[2-(3'-tert.-butyl-2'-hydroxy-5'-methylbenzyl)-6-tert.-butyl-4-methylphenyl]-terephthalate 1.5. Benzyl compounds 1,3,5-tri-(3,5-di-tert.-butyl-4-hydroxybenzyl)-2,4,6-trimethylbenzene
di-(3,5-di-tert.-butyl-4-hydroxybenzyl)-sulphide
3,5-di-tert.-butyl-4-hydroxybenzylmercaptoacetic acid isooctyl ester
bis(4-tert.-butyl-3-hydroxy-2,6-dimethylbenzyl)-dithiolterephthalate
1,3,5-tris(3,5-di-tert.-butyl-4-hydroxybenzyl)-isocyanurate
1,3,5-tris(4-tert.-butyl-3-hydroxy-2,6-dimethylbenzyl)isocyanurate
3,5-di-tert.-butyl-4-hydroxybenzylphosphonic acid dioctadecyl ester
calcium salt of 3,5-di-tert.-butyl-4-hydroxybenzylphosphonic acid monoethyl ester 1.6. Acylaminophenols 4-hydroxylauric acid anilide
4-hydroxystearic acid anilide
2,4-bisoctylmercapto-6-(3,5-di-tert.-butyl-4hydroxyanilino)-s-triazine
N-(3,5-di-tert.-butyl-4-hydroxyphenyl)-carbamic acid octyl ester 1.7. Esters of
$\beta$-(3,5-di-tert.-butyl-4-hydroxyphenyl)-propionic acid with monohydric or polyhydric alcohols, such as, for example, with methanol; diethylene glycol; octadecanol; triethylene glycol; 1,6-hexanediol; pentaerythritol; neopentyl glycol; trishydroxyethyl isocyanurate; thiodiethylene glycol; di-hydroxyethyloxalic acid diamide.

1.8. Esters of
β-(5-tert.-butyl-4-hydroxy-3-methylphenyl)-propionic acid with monohydric or polyhydric alcohols, such as, for example, with methanol; diethylene glycol; octadecanol; triethylene glycol; 1,6-hexanediol; pentaerythritol; neopentyl glycol; trishydroxyethyl isocyanurate; thiodiethylene glycol; di-hydroxyethyloxalic acid diamide.

1.9. Amides of
β-(3,5-di-tert.-butyl-4-hydroxyohenyl)-propionic acid, such as, for example, N,N'-di-(3,5-di-tert.-butyl-4-hydroxyphenylpropionyl)-hexamethylenediamine
N,N'-di-(3,5-di-tert.-butyl-4-hydroxyphenylpropionyl)-trimethylenediamine
N,N'-di-(3,5-di-tert.-butyl-4-hydroxyphenylpropionyl)-hydrazine 2. UV-Absorbers and light-stabilisers 2.1. 2-(2'-Hydroxyphenyl)-benzotriazoles, such as, for example, the 5'-methyl, 3',5'-di.-tert.-butyl, 5'-tert.-butyl, 5'-(1,1,3,3-tetramethylbutyl), 5'-chloro-3',5'-di-tert.-butyl, 5-chloro-3'-tert.-butyl-5'-methyl, 3'-sec.-butyl-5'-tert.-butyl, 4'-octyloxy, 3',5'-di-tert.-amyl or 3',5'-bis(α,α-dimethylbenzyl) derivative 2.2. 2-Hydroxybenzophenones, such as, for example, the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivative.

2.3. Esters of optionally substituted benzoic acids, such as, for example, 4-tert.-butylphenyl salicylate, phenyl salicylate, octylphenyl salicylate, dibenzoyl-resorcinol, bis(4-tert.-butylbenzoyl)-resorcinol, benzoylresorcinol, 3,5-di-tert.-butyl-4-hydroxybenzoic acid 2,4-di-tert.-butylphenyl ester or 3,5-di-tert.-butyl-4-hydroxybenzoic acid hexadecyl ester.

2.4. Acrylates, such as, for example,

α-cyano-β,β-diphenylacrylic acid ethyl ester or isooctyl ester, α-methoxycarbonylcinnamic acid methyl ester, α-cyano-β-methyl-p-methoxycinnamic acid methyl ester or butyl ester, α-methoxycarbonyl-p-methoxycinnamic acid methyl ester or N-(β-methoxycarbonyl-β-cyanovinyl)-2-methylindoline.

2.5. Nickel compounds, such as, for example, nickel complexes of 2,2'-thiobis[4-(1,1,3,3-tetramethylbutyl)-phenol], such as the 1:1- or the 1:2-complex, with additional ligands, such as triethanolamine or N-cyclohexyldiethanolamine, nickel dibutyl dithiocarbamate, nickel complexes of ketoximes, such as of 2-hydroxy-4-methylphenyl undecyl ketone oxime or nickel complexes of 1-phenyl-4-lauroyl-5-hydroxypyrazole, optionally with additional ligands.

2.6. Sterically hindered amines, such as, for example, bis(2,2,6,6-tetramethylpiperidyl)-sebacate bis(1,2,2,6,6-pentamethylpiperidyl)-sebacate n-butyl-3,5-di-tert.-butyl-4-hydroxybenzylmalonic acid bis(1,2,2,6,6-pentamethylpiperidyl)-ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert.-octylamino-2,6-dichloro-1,3,5-s-triazine, tris(2,2,6,6-tetramethylpiperidyl)-nitrilotriacetate, tetrakis(2,2,6,6-tetramethyl-4-piperidyl)-1,2,3,4-butanetetracarboxylic acid, 1,1'-(1,2-ethanediyl)-bis(3,3,5,5-tetramethylpiperazinone).

2.7. Oxalic acid diamides, such as, for example, 4,4'-di-octyloxyoxanilide, 2,2'-di-octyloxy-5,5'-di-tert.-butyloxanilide, 2,2'-di-dodecyloxy-5,5'-di-tert.-butyloxanilide, 2-ethoxy-2'-ethyloxanilide, N,N'-bis(3-dimethylaminopropyl)-oxalamide, 2-ethoxy-5-tert.butyl-2'-ethyloxanilide and its mixture with 2-ethoxy-2'-ethyl-5,4'-di-tert.-butyloxanilide or mixtures of ortho- and para-methoxy- and of o- and p-ethoxy-di-substituted oxanilides.

3. Metal deactivators, such as, for example,

N,N'-diphenyloxalic acid diamide, N-salicylal-N'-salicyloylhydrazine, N,N'-bissalicyloylhydrazine, N,N'-bis(3,5-di-tert.-butyl-4-hydroxyphenylpropionyl)-hydrazine, 3-salicyloylamino-1,2,4-triazole or bisbenzylideneoxalic acid dihydrazide.

4. Phosphites and phosphonites, such as, for example, triphenyl phosphite, diphenylalkyl phosphites, phenyldialkyl phosphites, tri-(nonylphenyl)-phosphite, trilauryl phosphite, trioctadecyl phosphite, distearylpentaerythritol diphosphite, tris(2,4-di-tert.-butylphenyl)-phosphite, diisodecylpentaerythritol diphosphite, di-(2,4-di-tert.-butylphenyl)-pentaerythritol diphosphite, tristearylsorbitol triphosphite or tetrakis(2,4-di-tert.-butylphenyl)-4,4'-biphenylene diphosphonite.

5. Peroxide-destroying compounds, such as, for example, esters of β-thiodipropionic acid, for example the lauryl, stearyl, myristyl or tridecyl ester, mercaptobenzimidazole, the zinc salt of 2-mercaptobenzimidazole, zinc dibutyl dithiocarbamate, di-octadecyl disulphide or pentaerythritol tetrakis(β-dodecylmercapto)-propionate.

6. Basic co-stabilisers, such as, for example, melamine, polyvinylpyrrolidone, dicyanodiamide, triallyl cyanurate, urea derivatives, hydrazine derivatives, amines, polyamides, polyurethanes, alkali and alkaline earth salts of higher fatty acids, for example Ca stearate, Zn stearate, Mg stearate, Na ricinoleate, K palmitate, antimony pyrocatecholate or tin pyrocatecholate.

7. Nucleation agents, such as, for example, 4-tert.-butylbenzoic acid, adipic acid or diphenylacetic acid.

8. Fillers and reinforcing agents, such as, for example, calcium carbonate, silicates, glass fibres, asbestos, talc, kaolin, mica, barium sulphate, metal oxides and hydroxides, carbon black or graphite.

9. Other additives, such as, for example, plasticisers, glidants, emulsifiers, pigments, optical brighteners, flame-proofing agents, antistatic agents or propellants.

The synergistic mixtures are explained in more detail by means of the following Example.

EXAMPLE 1

(a) Preparation of the samples 100 parts of low-density polyethylene powder (d=0.917) are mixed homogeneously in a Brabender plastograph for ten minutes at a temperature of 180oC with 0.15% by weight of the stabilisers listed in Table 1 or with 0.075% by weight of the first stabiliser component and with 0.075% by weight of the second stabiliser component (listed in Table 2). The homogenised mass is then pressed in a laboratory press to form a plate from 2 to 3 mm thick. Parts of this plate are, again in a press, exposed to a temperature of 170° C. and a pressure of 12 torr; a film 0.1 mm thick is formed which is quenched with cold water. Samples measuring 60×40 mm are cut out of this film.

(b) Test method

The film samples are irradiated in a XENOTEST 1200 apparatus. The samples are analysed at regular intervals in an IR spectrophotometer, the extinction at 5.85 μm being measured as an indication of the carbonyl content of the sample under examination. An increase in the carbonyl extinction is a measure of the photooxidative decomposition of the polymer (see Balaban et al., J. Pol. Sci., Part C, 22 (1969), 1059–1071) and is connected with the material's loss of mechanical strength. Irradiation is continued until a carbonyl extinction of 0.100 is achieved. The irradiation times $T_{0.1}$ up to this degree of damage are given in the following two Tables.

First, however, the following abbreviations should be introduced in order to simplify the designation of the stabilisers alone and in the synergistic mixtures, numbers being assigned to the individual compounds:

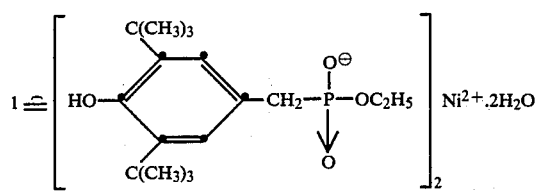

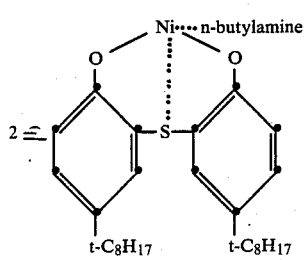

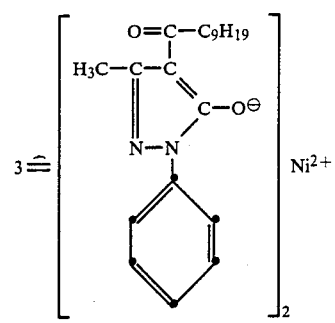

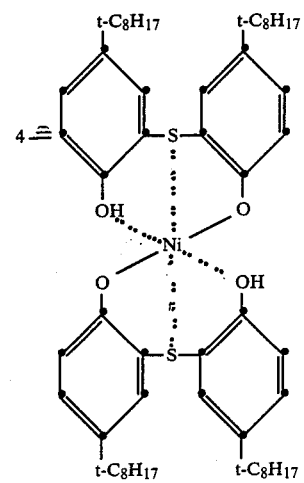

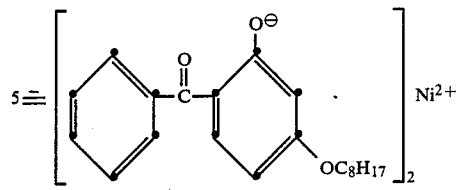

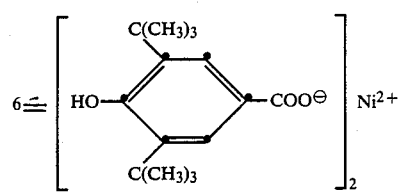

TABLE 1

XENOTEST 1200 up to 0.1 carbonyl extinction for Ni—complexes in "low-density" polyethylene

| Additive No. | Additive content [% by weight] | $T_{0.1}$ [h] |
|---|---|---|
| 1 | 0.15 | 510 |
| 2 | 0.15 | 1330 |
| 3 | 0.15 | 630 |
| 4 | 0.15 | 860 |
| 5 | 0.15 | 1000 |
| 6 | 0.15 | 1300 |
| control | none | 250 |

TABLE 2

XENOTEST 1200 up to 0.1 carbonyl extinction for synergistic Ni—stabiliser mixtures in "low-density" polyethylene.
(A and B represent the numbers assigned to the nickel stabilisers; % by weight is abbreviated to %).

| Stabiliser mixture 0.075% A + 0.075% B A/B | $(T_{0.1})_{0.075\% A + 0.075\% B}$ [h] | $\dfrac{(T_{0.1})_{0.15\% A} + (T_{0.1})_{0.15\% B}}{2}$ [h] | $(T_{0.1})_{0.15\% A}$ [h] | $(T_{0.1})_{0.15\% B}$ [h] |
|---|---|---|---|---|
| 5/2 | 1450 | 1165 | 1000 | 1330 |
| 5/4 | 1510 | 930 | 1000 | 860 |
| 2/3 | 1820 | 980 | 1330 | 630 |
| 2/1 | 1670 | 920 | 1330 | 510 |
| 4/3 | 1120 | 745 | 860 | 630 |
| 5/3 | 940 | 815 | 1000 | 630 |
| 2/4 | 1140 | 1095 | 1330 | 860 |
| 4/1 | 890 | 685 | 860 | 510 |

It can be seen from these results that the stabiliser mixtures given in Table 2 have a synergistic effect.

I claim:

1. A stabilizer composition containing at least one Ni-containing light stabilizer selected from each of class I and of class II or from each of class I and of class II':

class I compounds having the formula I

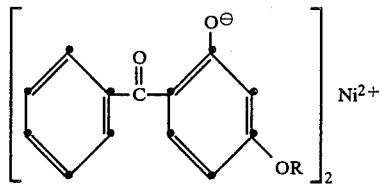

(I)

in which R represents $C_1$–$C_{12}$-alkyl, and class II or class II' compounds having the formula II or II'

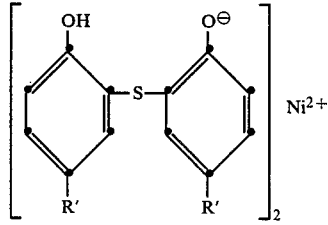

(II)

-continued or

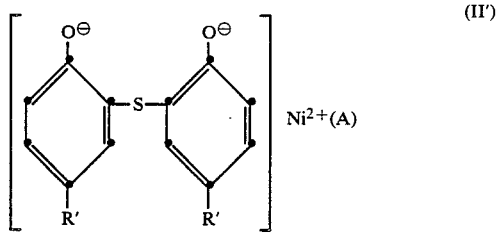

(II')

in which R' represents $C_1$–$C_8$-alkyl and in which nickel in formula II' optionally contains an additional ligand A which is a primary or secondary $C_1$–$C_{18}$-alkylamine, triethanolamine, cyclohexyldiethanolamine, aniline, anisidine, toluidine, 1-naphthylamine, 2-naphthylamine, p-butylaniline, xylidine, p-octyloxyaniline, morpholine, hexamethyleneimine, piperazine or piperidine.

2. A stabilizer composition according to claim 1 containing two nickel-containing light stabilizers selected from the group consisting of
   (a) 2,2'-thiobis(4-tert-octylphenolato)-butylamino nickel(II)/nickel(II) chelate of 2-hydroxy-4-octyloxybenzophenone, and
   (e) nickel(II) chelate of 2-hydroxy-4-octyloxybenzophenone/bis[2,2'-thiobis(4-tert-octylphenolato)]-nickel(II).

* * * * *